United States Patent [19]

Powers

[11] Patent Number: 5,189,943
[45] Date of Patent: Mar. 2, 1993

[54] DEVICE FOR REDUCING ICING

[75] Inventor: Frederick A. Powers, Maple Grove, Minn.

[73] Assignee: Graco Inc., Minneapolis, Minn.

[21] Appl. No.: 923,234

[22] Filed: Jul. 31, 1992

[51] Int. Cl.$^5$ ............................................. F01B 11/02
[52] U.S. Cl. .................................. 92/169.1; 92/171.1
[58] Field of Search .................. 92/169.1, 169.2, 169.3, 92/170.1, 171.1; 91/419

[56] References Cited

U.S. PATENT DOCUMENTS

| | | | |
|---|---|---|---|
| 2,378,045 | 6/1945 | Sorensen et al. | 92/171.1 |
| 3,439,586 | 4/1969 | Holtan et al. | 92/169.1 |
| 4,682,571 | 7/1987 | Kaufman et al. | 60/320 X |
| 4,921,408 | 5/1990 | Kvinge et al. | 417/368 |

FOREIGN PATENT DOCUMENTS 228566  7/1963  Austria ............................... 92/170.1
978837 12/1964  United Kingdom ............... 92/171.1
2070732  9/1981  United Kingdom ............... 92/171.1

Primary Examiner—Edward K. Look
Assistant Examiner—Hoang Nguyen
Attorney, Agent, or Firm—Douglas B. Farrow

[57] ABSTRACT

An air operating reciprocating motor which is used to drive reciprocating piston pumps or other such devices has located in the exhaust passage thereof a liner made of a flexible elastomeric material. The inside surface of the liner which routes the exhaust area is generally smooth and the outside surface of the liner is spaced from the surface of the passage in which it is located by a number of spacer elements such as rounded knobs. The material between the spacing elements is then allowed to flex when the exhausted relatively high pressure air passes through, thus continually flexing the liner with every cycle of the motor and preventing the buildup of ice in the exhaust passage.

5 Claims, 2 Drawing Sheets

DEVICE FOR REDUCING ICING

BACKGROUND OF THE INVENTION

Reciprocating air motors of the type used to drive reciprocating piston pumps and the like have been well known for many years. One problem with such products has been that when operating continuously in humid air, the condensation which forms in the exhaust of the air motor and the air valve tends to form ice which can eventually lead to slowing or indeed complete stopping of the pump. The pump is then out of action until the ice is thawed, hopefully through a high enough ambient temperature.

Various efforts have been made to reduce such icing and toward that end, my prior U.S. Pat. No. 4,921,408 and my currently pending U.S. Pat. application Ser. No. 07/904,447, filed Jun. 25, 1992, show ways of greatly reducing this problem. The techniques shown in the aforementioned patent and application (the contents which are hereby incorporated by reference) are not always entirely effective, particularly when the passage through which the exhaust travels is located such that it is difficult to apply heat to it by the known methods.

SUMMARY OF THE INVENTION

It is therefore, an object of this invention to provide a method of preventing ice build up in exhaust passages in a manner which is easily and inexpensively accomplished and which works effectively.

Towards this end, a passageway is provided with a tubular liner, which has a generally smooth inner surface and an outer surface which is spaced away from the interior of the passage by a number of spacing elements. The spacing elements extend outwardly to locate the liner within the passage, and either end of the liner is sealed to the passage by a ridge. The liner is made from a flexible material, so that when the high pressure exhaust air passes through it, the liner flexes, thereby causing any ice which may form to flake off and be carried on through the passage and out the ultimate exhaust.

These and other objects and advantages of the invention will appear more fully from the following description made in conjunction with the accompanying drawings wherein like reference characters refer to the same or similar parts throughout the several views.

A BRIEF DESCRIPTION OF THE DRAWINGS

DESCRIPTION OF THE PREFERRED EMBODIMENT

The instant invention, generally designated 10, is designed for use in a reciprocating air motor 12 of the type which is generally well known (such as that sold by the assignee of the instant invention under the trademark KING), and which has an air valve 14 as set forth in the aforementioned U.S. Pat. application.

Figure 1:
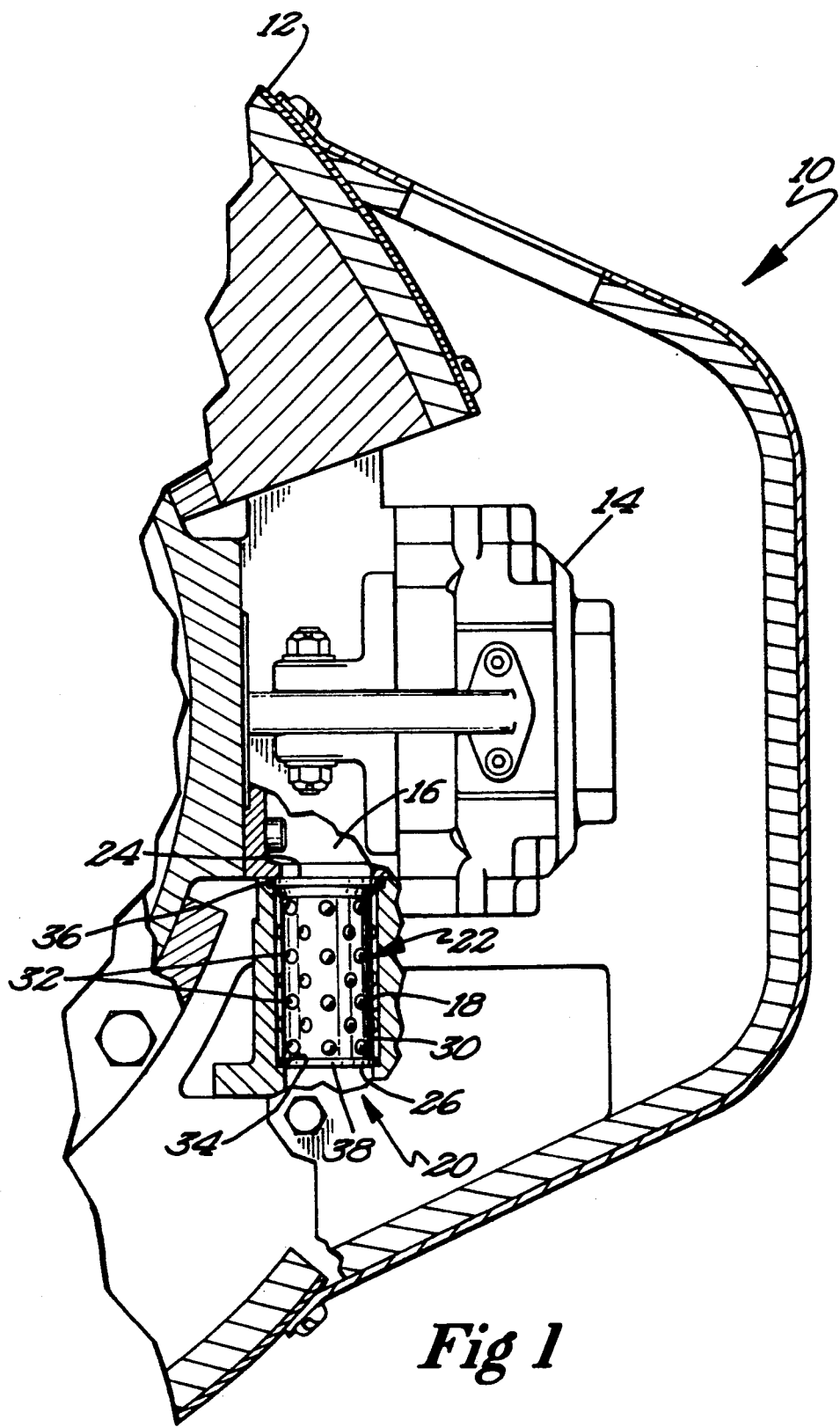
FIG. 1 is a partially cut away view of an air motor utilizing the instant invention.
Figure 2:
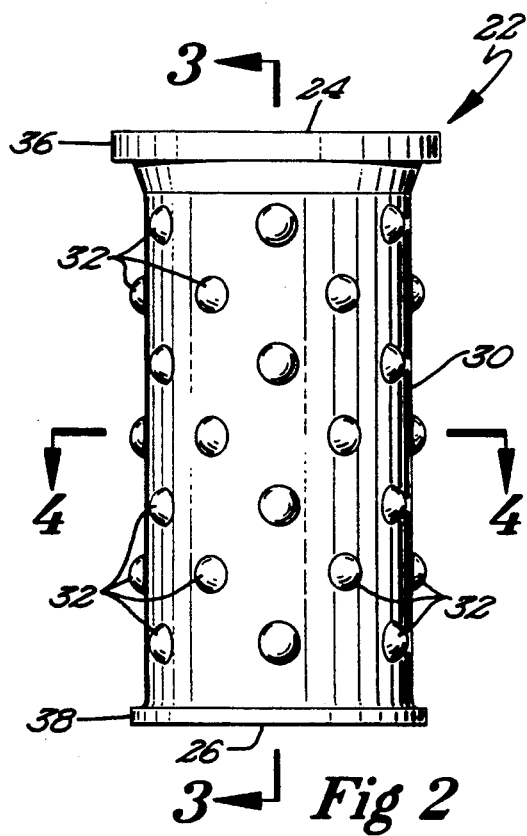
FIG. 2 is a side plan view of the liner of the instant invention.
Figure 3:
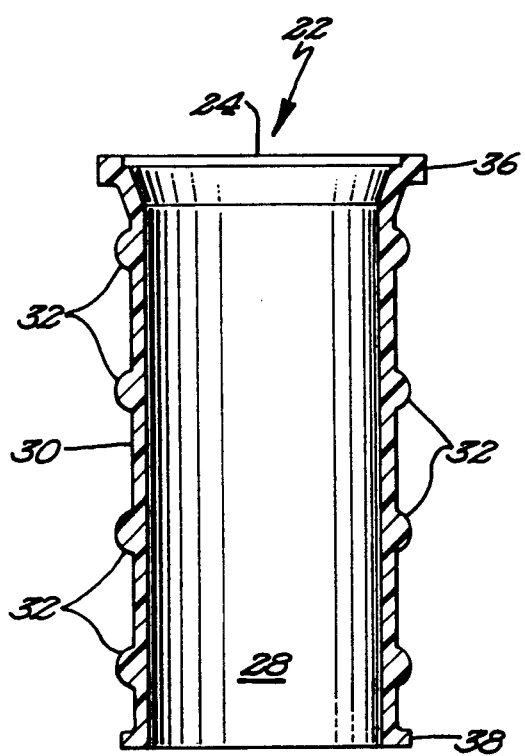
FIG. 3 is a sectional view taken along line 3—3 of FIG. 2.
Figure 4:
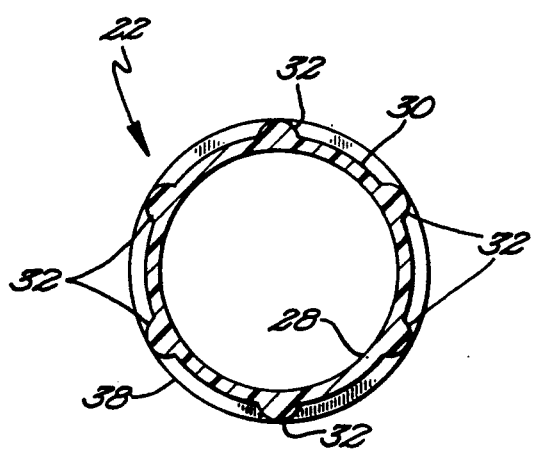
FIG. 4 is a cross-sectional view taken along line 4—4 of FIG. 2.

The exhaust 16 from air valve 14 exits into a passage 18, which leads to muffler assembly 20, as more fully set out in the aforementioned U.S. Pat. Located in passage 18 is liner 22 which has first and second ends 24 and 26 respectively, as well as inner and outer surfaces 28 and 30 respectively. Extending outwardly from outer surface 30 are a plurality of spacer elements 32, which as can be seen in FIG. 1, contact the inner surface of passage 18.

In the preferred embodiment, liner 22 is formed from a polyurethane molding material having a tensile strength of about 3800 psi, a tensile modulus (@ 100% elongation) of 650 psi and an elongation (break) of 500% (all under ASTM test D412). The shore hardness should be about A80±5 under ASTM test D2240. Ideally, the differences between the inner and outer diameters or the diameters of the inner or outer surfaces 28 and 30 is approximately three millimeters which yields a wall thickness or approximately 1.5 millimeters.

Thus, when subjected exhaust pressures on the order of 50 psi, appropriate flexing will take place and ice will crack and otherwise shed from the smooth inner surface 28 of liner 22. Liner 22 is located at its second end 26 in passage 18 via a shoulder 34, while first end 24, a shoulder 36 seals the against the end of passage 18. Similarly, a ridge 38 at second end 26 helps seal at that end.

It is contemplated that various changes and modifications may be made to the air motor ice inhibiting device without departing from the spirit and scope of the invention as defined by the following claims.

What is claimed is:

1. In an air-generated motor having an exhaust passage which is susceptible to icing, said exhaust passage having cross-sectional dimensions, the improvement comprising a generally tubular liner being located in said passage, said liner comprising:

an outer surface having dimensions less than said passage cross-sectional dimensions;

a generally smooth inner surface; and a plurality of spacer elements extending outwardly from said outer surface to space said outer surface from said passage and to locate said liner relative to said passage, said liner being formed of a flexible material such that when compressed air is exhausted through said passage and said liner, portions of said liner intermediate said spacer elements will flex sufficiently to prevent ice buildup.

2. The air-operated motor of claim 1 wherein said liner is comprised of an elastomeric material.

3. The air-operated motor of claim 1 wherein said spacer elements comprise rounded knobs.

4. The air-operated motor of claim 1 wherein said liner is molded in a single piece from elastomeric material.

5. The air-operated motor of claim 1 where said liner comprises first and second ends and a ridge protruding from at least one of said ends to firmly locate and seal said liner in said passage.

* * * * *